(12) United States Patent
Hasebe

(10) Patent No.: US 7,617,724 B2
(45) Date of Patent: *Nov. 17, 2009

(54) THERMAL MASS FLOW METER HAVING A HEATER AND PAIRED TEMPERATURE SENSOR CHIPS SEPARATELY FORMED AND MOUNTED ON THE FLOW PIPE

(75) Inventor: Shinya Hasebe, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 84 days.

This patent is subject to a terminal disclaimer.

(21) Appl. No.: 11/907,807

(22) Filed: Oct. 17, 2007

(65) Prior Publication Data
US 2008/0092644 A1    Apr. 24, 2008

(30) Foreign Application Priority Data
Oct. 18, 2006    (JP) .............................. 2006-283498

(51) Int. Cl.
G01F 1/68    (2006.01)
(52) U.S. Cl. ................................... 73/204.27
(58) Field of Classification Search .............. 73/204.26, 73/204.27
See application file for complete search history.

(56) References Cited

U.S. PATENT DOCUMENTS

| | | | | |
|---|---|---|---|---|
| 4,616,505 | A * | 10/1986 | Jouwsma | 73/204.26 |
| 6,628,202 | B2 * | 9/2003 | McQueen et al. | 73/204.27 |
| 6,813,944 | B2 | 11/2004 | Mayer et al. | |
| 6,981,410 | B2 * | 1/2006 | Seki et al. | 73/204.26 |
| 7,444,863 | B2 * | 11/2008 | Sakai | 73/204.27 |
| 2005/0028587 | A1 * | 2/2005 | Baer et al. | 73/204.26 |
| 2007/0137297 | A1 * | 6/2007 | Gehman et al. | 73/204.26 |
| 2008/0047339 | A1 * | 2/2008 | Hasebe | 73/204.27 |
| 2008/0148841 | A1 * | 6/2008 | Sakai | 73/204.26 |

FOREIGN PATENT DOCUMENTS

JP    09-133563    5/1997

\* cited by examiner

*Primary Examiner*—Harshad Patel
(74) *Attorney, Agent, or Firm*—Cheng Law Group, PLLC

(57) ABSTRACT

A piping is anchored onto the lower faces of a heater chip and temperature sensor chips by using a thermal conductive adhesive. The heater chip and the temperature sensor chips are coated with a molding resin, and thermal resistance up to an element formed inside thereof is made smallest on a lower face side.

5 Claims, 5 Drawing Sheets

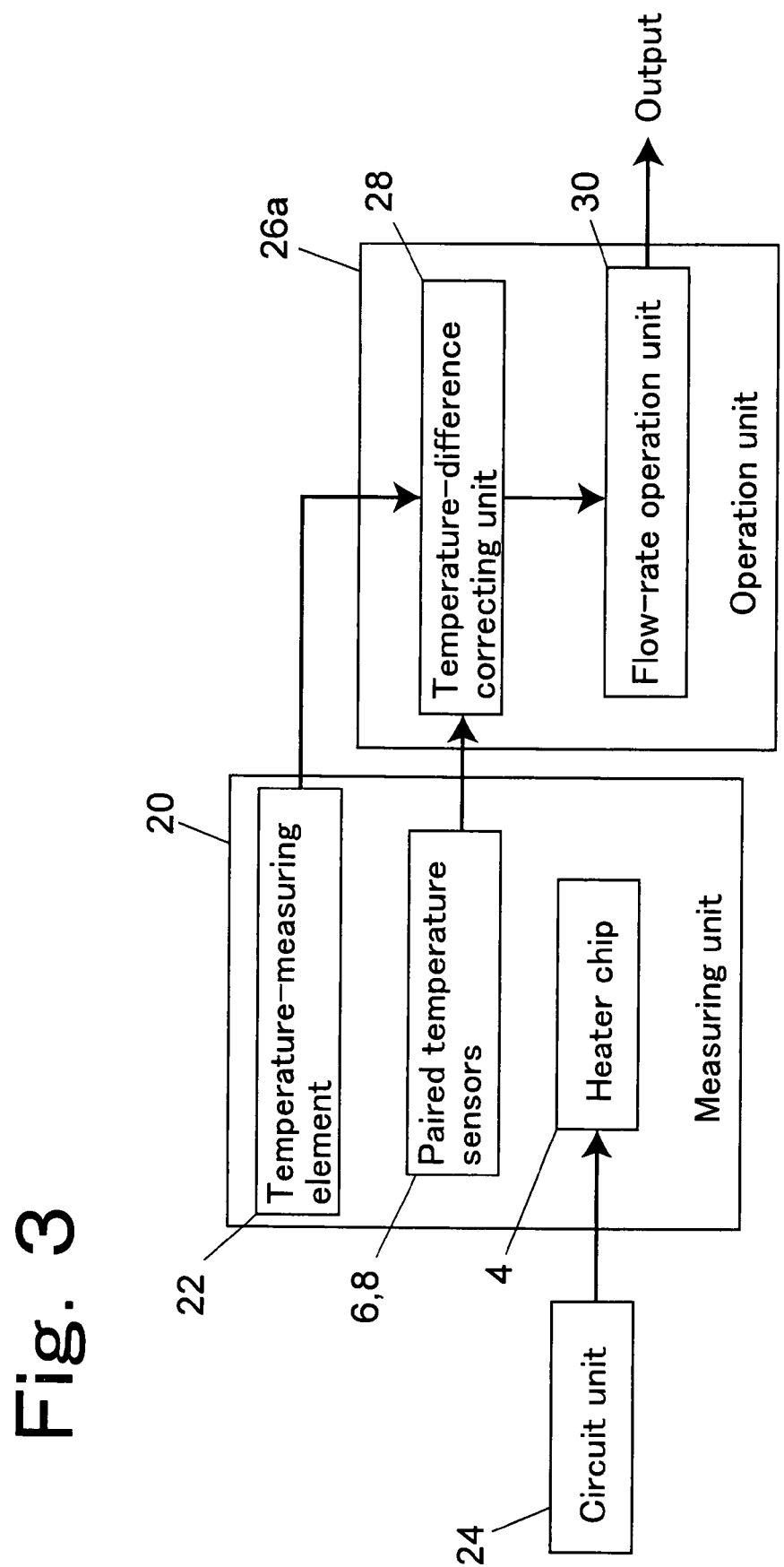

THERMAL MASS FLOW METER HAVING A HEATER AND PAIRED TEMPERATURE SENSOR CHIPS SEPARATELY FORMED AND MOUNTED ON THE FLOW PIPE

BACKGROUND OF THE INVENTION

1. Field of the Invention

This invention relates to a thermal mass flow meter that measures a mass flow rate of a fluid flowing through a piping based upon a temperature distribution of the fluid in a flowing direction of the fluid.

2. Description of the Related Art

Referring to FIGS. 5A and 5B, the following description will discuss a conventional thermal mass flow meter. FIG. 5A is a cross-sectional view and FIG. 5B is a graph that shows a temperature distribution on a surface of a piping. In FIG. 5B, the axis of abscissas represents the position in a flowing direction, and the axis of ordinates represents the temperature. A curved line, indicated as a broken line, represents the temperature distribution in a state with no fluid flowing through the piping, and a curved line, indicated by a solid line, represents the temperature distribution in a state with a fluid flowing through the piping.

As shown in FIG. 5A, a heater 32 is secured onto a surface of a peripheral face of a piping 31 in contact therewith, and paired temperature sensors 34 (34a, 34b), which are used for measuring a surface temperature of the piping 31, are placed at positions in the flowing direction of the piping 31 on an upstream side and a downstream side of the heater 32, with equal distance apart therefrom. In this example, a flow-rate measuring chip 36 in which the heater 32 and paired temperature sensors 34 are assembled in a single substrate by using a MEMS (Micro Electro Mechanical System) technique, and the flow-rate measuring chip 36 is attached to the piping 31 so that the flow rate in the piping 31 can be measured (for example, see U.S. Pat. No. 6,813,944).

In the thermal mass flow meter, the fluid inside the piping is heated to a predetermined temperature by the heater 32, and the surface temperatures of the pipe 31 at the respective positions are measured by the temperature sensors 34a and 34b. The temperature distribution of the fluid heated by the heater 32 comes to have virtually a Gaussian distribution; therefore, when the fluid stands still, the temperatures detected by the two temperature sensors 34a and 34b are equal to each other as indicated by a broken line in FIG. 5B, with the result that the measured temperature difference between the two positions becomes zero. When the fluid flows through the piping 31, the temperature distribution is shifted toward the downstream side and changed as indicated by a solid line in FIG. 5B so that the temperatures detected by the temperature sensors 34a and 34b have a difference. The temperature distribution of the surface of the piping 31 is shifted toward the downstream side as the flow rate of the fluid flowing through the piping 31 increases; therefore, when the apex of the temperature distribution of the surface of the piping 31 is located between the temperature sensors 34a and 34b, the difference in measured temperatures has a greater value as the flow rate of the fluid flowing through the piping 31 increases. In this manner, since there is a correlation between the flow rate of the fluid flowing through the piping 31 and the difference in measured temperatures between the temperature sensors 34a and 34b, the flow rate of the fluid flowing through the piping 31 can be calculated based upon the difference in measured temperatures between the temperature sensors 34a and 34b by utilizing the correlation.

In this thermal mass flow meter using the chip 36 for use in measuring the flow rate in which the heater 32 and the paired temperature sensors 34a and 34b are assembled together with each other, the paired temperature sensors 34 can be placed in the vicinity of the heater by using the MEMS technique. Consequently, even in the case when the amount of transfer of the temperature distribution is small, since the temperatures of the temperature sensors 34a and 34b can be measured at positions, each having an abrupt inclination, of the curved line (see FIG. 5B) indicating the temperature distribution of the temperature sensor chip, it becomes possible to obtain a greater value as a measured temperature difference even upon having a fine amount of flow rate, and consequently to carry out a flow-rate measuring process with high sensitivity.

However, the process for assembling the heat generating element 32 and the paired temperature sensors 34 onto a single substrate by using the MEMS technique requires expensive manufacturing facilities, and can not be achieved at low costs. For this reason, the inventors of the present invention have proposed a structure in which a chip-type heater chip serving as a heat-generating element and paired temperature sensors, manufactured separately from the heater chip, are independently placed on the peripheral face of the piping so that a thermal mass flow meter is formed. With this structure, since the MEMS technique is no longer required, it becomes possible to manufacture the thermal flow meter at low costs.

SUMMARY OF THE INVENTION

An objective of the present invention is to improve measuring performance in the proposed thermal mass flow meter.

In the thermal mass flow meter, measuring sensitivity of a temperature sensor chip directly influences the results of measurements of the flow rate. Therefore, the present invention aims to improve the measuring performance by improving the measuring sensitivity of the temperature sensor chip.

In the temperature sensor chip of a contact type to be used as a temperature sensor for the thermal mass flow meter, the measuring sensitivity defers depending on the contact position to a measuring subject due to thermal resistance caused by a coating resin covering a temperature-measuring element. In other words, by making the measuring subject touch a position of the chip having the smallest thermal resistance, it is possible to obtain a high measuring sensitivity; in contrast, when the measuring subject touches a position having a great thermal resistance, the measuring sensitivity is lowered.

The thermal mass flow meter is provided with a measuring unit configured by a heater chip and paired temperature sensor chips and an operation unit used for finding the flow rate of a fluid flowing through the piping based upon the temperature difference between the paired temperature sensor chips. The heater chip is placed on a peripheral face of the piping through which a fluid is flowing, and the fluid inside the piping is heated. In the present invention, the paired temperature sensor chips are prepared as chip-type temperature sensor chips made as members separated from the heater chip, and these temperature sensor chips are placed at positions on an upstream side and a downstream side of the heater chip with equal distance apart therefrom in the flowing direction of a fluid in the piping on the peripheral face of the piping on the same side as the heater chip with respect to the piping. Each of the temperature sensor chips has a surface coated with a molding resin and is provided with an input/output terminal that extends sideward from a lower face that is a face on the side having the smallest thermal resistance to the element formed therein of the faces of the molding resin. Moreover, the lower face of each of the temperature sensor chips is anchored onto the piping. With this structure, the temperature that is closer to the temperature of a surface of the piping can be detected so that it becomes possible to reduce the heat loss on the surface of the piping, and consequently to improve the sensitivity of the measurement of the flow rate.

Here, the "lower face side" is defined as a face located on the side having the smallest thermal resistance to the element formed therein of the faces of the molding resin.

Moreover, the heater chip may also be prepared as a member having its surface coated with a molding resin. In this case, the heater chip is preferably provided with an input/output terminal that extends sideward from a lower face that is a face on the side having the smallest thermal resistance to the element formed therein of the faces of the molding resin, and the piping is preferably anchored onto the lower face of the heater chip. With this structure, it is possible to reduce the heat loss from a heat generating element inside the heater chip to the fluid inside the piping, and consequently to make the piping temperature of a portion on which the heater chip is placed closer to the preset temperature.

In general, the thermal mass flow meter is driven so that the heater chip, placed between the paired temperature sensor chips, is maintained at a temperature range from the ambient temperature (room temperature)+several ° C. to several tens of ° C. Since the thermal mass flow meter detects the flow rate from a temperature difference between the temperature sensor chips on the upstream side and the downstream side of the heater chip, it is supposed that even if the ambient temperature varies, the influence from the temperature change imposed on the two temperature sensor chips can be cancelled. However, in an actual operation, since the amount of an adhesive used for anchoring the respective temperature sensor chips onto the piping tends to be uneven or since a thickness of the molding resin of the chips used for temperature chips tends to become irregular, reaction rates to a variation of the ambient temperature tend to differ between the temperature sensor chips in some cases. In such a case, the resulting flow meter lacks stability to the ambient temperature, failing to provide a sufficient measuring performance.

Therefore, in accordance with a preferred mode of the thermal mass flow meter of the present invention, the measuring unit is provided with a temperature-measuring element for measuring the ambient temperature of the measuring unit separately from the paired temperature sensor chips, and the operation unit is provided with a correction unit used for correcting the temperature difference of the paired temperature sensor chips based upon the ambient temperature measured by the temperature-measuring element; thus, the flow rate of the fluid flowing through the piping is determined based upon the temperature difference between the paired temperature sensor chips after the correcting process. This arrangement makes it possible to carry out a stable flow-rate measuring process even when the ambient temperature varies.

Moreover, in a more preferable mode, the measuring unit has a substrate with a groove to which the heater chip and the temperature sensor chips are fitted, and the heater chip and the temperature sensor chips are fitted to the groove from an upper face side opposite to the lower face side. The piping is anchored onto the heater chip and the temperature sensor chips by a thermal conductive adhesive, while touching the lower face of the heater chip and the lower face of the temperature sensor chips.

Here, the piping may be anchored onto the substrate by an adhesive.

BRIEF DESCRIPTION OF THE DRAWINGS

FIG. 1A is a plan view, FIG. 1B is a cross-sectional view taken along line X-X of FIG. 1A, and FIG. 1C is a cross-sectional view taken along line Y-Y of FIG. 1A.

FIG. 2A is a plan view, FIG. 2B is a cross-sectional view taken along line X-X of FIG. 2A, and FIG. 2C is a cross-sectional view taken along line Y-Y of FIG. 2A.

FIG. 3 is a block diagram that shows another embodiment.

FIG. 4A is a cross-sectional view of a thermal mass flow meter, and FIGS. 4B and 4C are graphs that show the relationship between room temperature and the surface temperature of a piping.

FIG. 5A is a cross-sectional view, and FIG. 5B is a graph that shows a temperature distribution of the surface of the piping.

DETAILED DESCRIPTION OF THE INVENTION

Figure 1A:
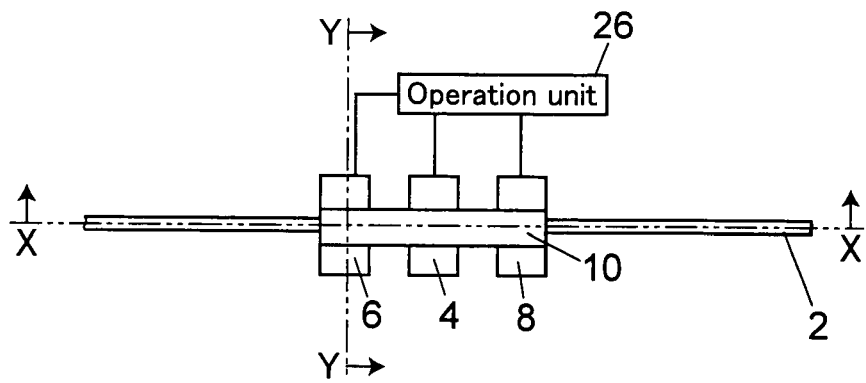
FIGS. 1A to 1C are views that show a thermal mass flow meter in accordance with one embodiment.
Figure 1B:
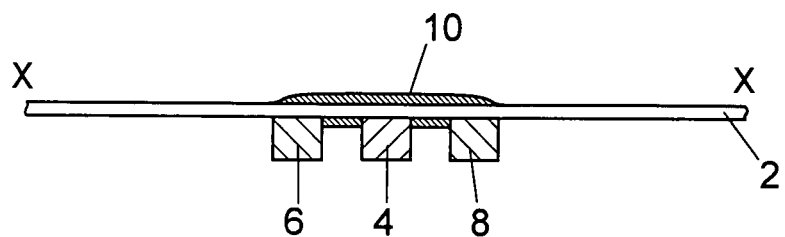
Figure 1C:
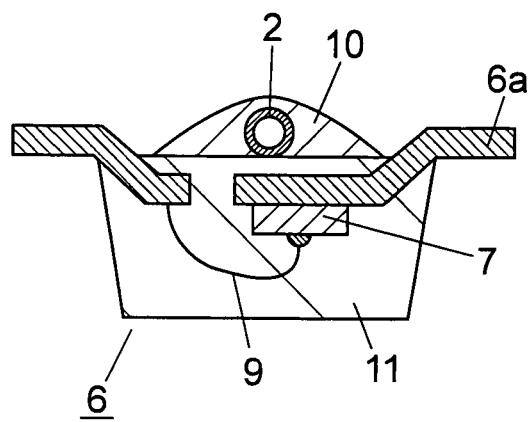

FIGS. 1A to 1C are views that show a thermal mass flow meter in accordance with one embodiment, FIG. 1A is a plan view, FIG. 1B is a cross-sectional view taken along line X-X of FIG. 1A, and FIG. 1C is a cross-sectional view taken along line Y-Y of FIG. 1A.

A heater chip 4 serving as a heat generating element is placed on a lower side of a capillary 2 serving as piping used for fluid-transporting a minute sample, in a manner so as to be touching therewith. Here, based upon the state shown in FIG. 1B, the "lower side" is defined; however, the present embodiment is not intended to be limited by this layout. The capillary 2 may be placed in a perpendicular direction, and in this case also, a side having a convex portion of each of elements 4, 6 and 8 on a side opposite to the capillary 2 is referred to as the lower side. With respect to the heater chip 4, for example, a chip diode ISS387 (product made by Toshiba Corp.) and a chip resistor RK73H1JT (product made by Koa Corporation) may be used. On an upstream side and a downstream side of the heater chip 4, temperature sensor chips 6 and 8, forming paired sensor chips, are placed with equal distance apart from the heater chip 4, while touching with the piping 2. Chip-type diodes are used as the temperature sensor chips 6 and 8. The heater chip 4 and the temperature sensor chips 6 and 8 form a measuring unit of this thermal mass flow meter.

The heater chip 4 and the temperature sensor chips 6 and 8 are anchored by using a thermal conductive adhesive 10. Each of these chips 4, 6 and 8 is made in contact with the piping 2 and anchored thereon at a portion in which the thermal resistance to an inner element formed inside the molding resin covering a peripheral portion thereof is made smallest, that is, the lower face of each of the chips 4, 6 and 8.

The structure of the temperature sensor chip 6 is, for example, shown in FIG. 1C, and in the temperature sensor chip 6 in this Figure, a diode 7 having a PN junction formed thereon is electrically connected to a terminal 6a through a bonding wire 9, with the diode 7 being coated with a molding resin 11 made from, for example, epoxy resin. The terminal 6a is directed outside from an end portion of the lower face (upper side in the Figure) of a package made from the molding resin 11. The piping 2 is anchored to the temperature sensor chip 6 by the thermal conductive adhesive 10 while touching the lower face of the package made from the molding resin 11. In this case, the face on the side from which the terminal 6a of the temperature sensor chip 6 protrudes is defined as the lower face, and the face on the opposite side is defined as an upper face. The same is true for the heater chip 4 and the temperature sensor chip 8.

In the temperature sensor chip 6 of FIG. 1C, only the molding resin 11 made from epoxy resin is located in a gap from the diode 7 to a surface on the upper face side (lower side in the Figure) of the temperature sensor chip 6, and metal forming the terminal 6a and the molding resin 11 are located in a gap from the diode 7 to a surface on the lower face side (upper side in the Figure) of the temperature sensor chip 6. In general, the thermal conductivity of the metal is in a range from several tens (W/m·K) to several hundreds (W/m·K), while the thermal conductivity of the epoxy resin is in a range from 0. several (W/m·K) to several (W/m·K). That is, the metal has a thermal conductivity several tens to several thousands times higher than that of the epoxy resin.

The thermal resistance $R_T$ is represented by the following equation (1):

$$R_T = L/(A \times \lambda) \tag{1}$$

In this equation, L represents a distance, A represents an area and $\lambda$ represents a thermal conductivity.

Supposing that the distance from the diode 7 to the surface on the upper face side of the temperature sensor chip 6 and a distance therefrom to the surface on the lower face side are in the same level and that the areas on the upper face and the lower face are also in the same level, the thermal resistance $R_T$ from the diode 7 to the surface on the lower face side of the temperature sensor chip 6 becomes smaller to a degree corresponding to the interposed metal forming the terminal 6a.

Therefore, in the temperature sensor chip 6 having the above-mentioned arrangement, since the structure having the piping 2 anchored onto the lower face side makes the thermal loss from the piping 2 to the diode 7 smaller in comparison with the structure having the piping 2 anchored onto the upper face side, the diode 7 is allowed to detect a temperature closer to the surface temperature of the piping 2. Here, only the temperature sensor chip 6 has been explained; however, the same is true for the heater chip 4 and the temperature sensor chip 8.

With respect to the heater chip 4, by making the thermal resistance from an inner heat generating element formed therein to the portion in contact with the piping 2 smallest, the thermal loss from the inner heat generating element to the piping 2 is made smaller so that the heat of the inner heat generating element is made to easily transmit to the piping 2; therefore, in the case when the heater is controlled to a fixed temperature, the precision of the temperature control on the surface of the piping 2 can be improved.

The sensor chips 6 and 8 are respectively connected to the operation unit 26. The operation unit 26 reads the measured temperatures from the temperature sensor chips 6 and 8 as signals, and calculates the flow rate by using the temperature difference, based upon a calibration line formed by preliminarily finding the flow rate of a moving phase flowing through the capillary 2 and stored therein. In other words, the correlation between the detected temperature difference between the temperature sensor chips 6 and 8 and the flow rate of the fluid, preliminarily measured, is stored in the operation unit 26 as a calibration line so that the flow rate of a fluid flowing through the capillary 2 can be automatically calculated from the detected temperature difference between the temperature sensor chips 6 and 8. The operation unit 26 may be achieved by a CPU or a personal computer.

Figure 2A:
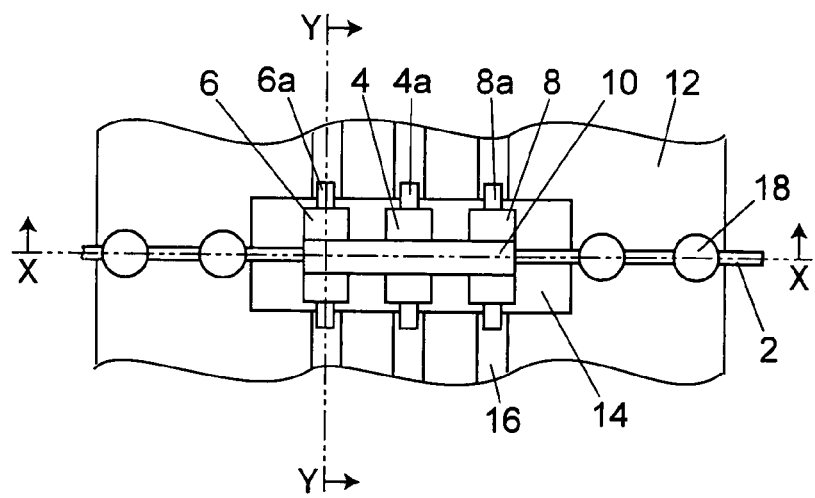
FIGS. 2A to 2C are views that show one example of a measuring unit of the thermal mass flow meter utilizing a substrate.
Figure 2B:
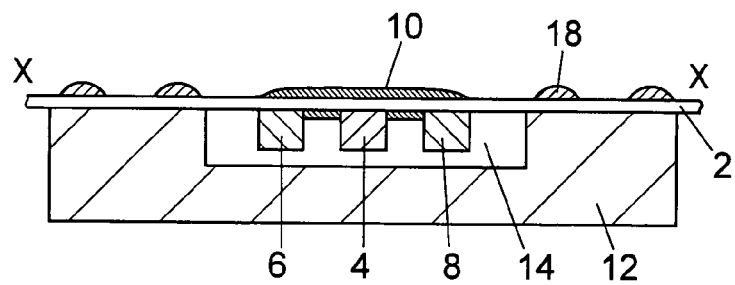
Figure 2C:
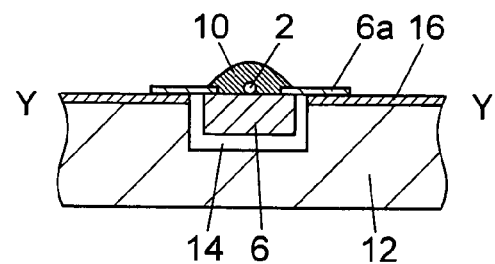

The measuring unit of the thermal mass flow meter, shown in FIGS. 1A to 1C, is preferably anchored onto the capillary 2 by utilizing a substrate. FIGS. 2A to 2C are views that show one example of the measuring unit of the thermal mass flow meter utilizing the substrate, and FIG. 2A is a plan view, FIG. 2B is a cross-sectional view taken along line X-X of FIG. 2A, and FIG. 2C is a cross-sectional view taken along line Y-Y of FIG. 2A.

A substrate 12 used in this embodiment is a printed wiring substrate on which a wiring pattern 16 is formed from a center portion toward outside portions (peripheral portions), and a concave section 14 is formed in the center portion. In the concave section 14, the heater chip 4 and the temperature sensor chips 6 and 8 are inserted with their contact faces to the capillary 2 facing up ("up and down" are defined in the state shown in FIGS. 2B and 2C). The thermal mass flow meter is provided with an input/output terminal 4a of the heater chip 4, an input/output terminal 6a of the temperature sensor chip 6, and an input/output terminal 8a of the temperature sensor chip 8. The input/output terminals 4a, 6a and 8a touch the edge of the concave section 14, and are anchored onto the wiring pattern 16 that extends outward from the edge of the concave section 14, for example, by soldering so as to be electrically connected thereto and also mechanically secured thereto. The capillary 2 is anchored onto the substrate 12 at four points by using, for example, a heat insulating adhesive 18. With respect to the heat insulating adhesive 18, for example, RTV silicone rubber (SE9175; product made by Dow Corning Toray Silicone Co., Ltd.) may be used. In this case, the RTV silicone rubber adhesive prepared as a low-molecular siloxane reduced product is preferably used.

By utilizing such a substrate 12, the capillary 2, the heater chip 4 and the temperature sensor chips 6 and 8 are easily anchored thereon, and the heater chip 4 and the temperature sensor chips 6 and 8 can be protected by the substrate 12. Moreover, by using a printed circuit substrate as the substrate 12, the input/output terminals of the heater chip 4 and the temperature sensor chips 6 and 8 can be pulled into external apparatuses by using the wiring pattern 16 of the wiring substrate 12; thus, it becomes possible to easily arrange the wiring.

Moreover, by anchoring the piping 2 onto the substrate 12 by using the heat insulating adhesive 18, it becomes possible to prevent a stress from concentrating on each of the anchored portions among the piping 2, the heater chip 4 and the temperature sensor chips 6 and 8, and consequently to prevent the heater chip 4 and the temperature sensor chips 6 and 8 from separating from the piping 2.

FIG. 3 is a block diagram that shows another embodiment of the thermal mass flow meter. The thermal mass flow meter is provided with a circuit unit 24 used for driving the heater chip 4. The heater chip 4 is driven by the circuit unit 24 so that the heating temperature thereof is maintained at a temperature range from room temperature+several ° C. to several tens of ° C.

In addition to the heater chip 4 and the temperature sensor chips 6 and 8, the measuring unit 20 is provided with a temperature-measuring element 22 used for measuring the ambient temperature (room temperature). The structure of the measuring unit 20 except for the temperature-measuring element 22 is the same as that shown in FIGS. 2A to 2C, and the temperature-measuring element 22 is placed on, for example, the substrate 12.

In addition to a flow-rate operation unit 30 used for calculating the flow rate from the temperature difference measured by the temperature sensor chips 6 and 8, the operation unit 26a is provided with a temperature-difference correcting unit 28 that corrects the temperature difference between the temperature sensor chips 6 and 8 based upon the room temperature measured by the temperature-measuring element 22.

Figure 4A:
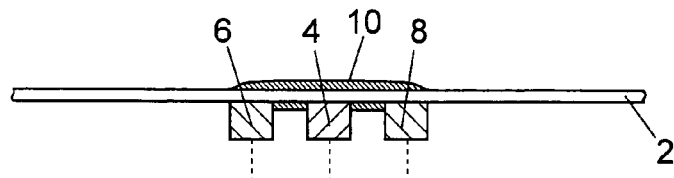
FIGS. 4A to 4C explain a method for correcting a temperature difference detected by paired temperature sensor chips.
Figure 4B:
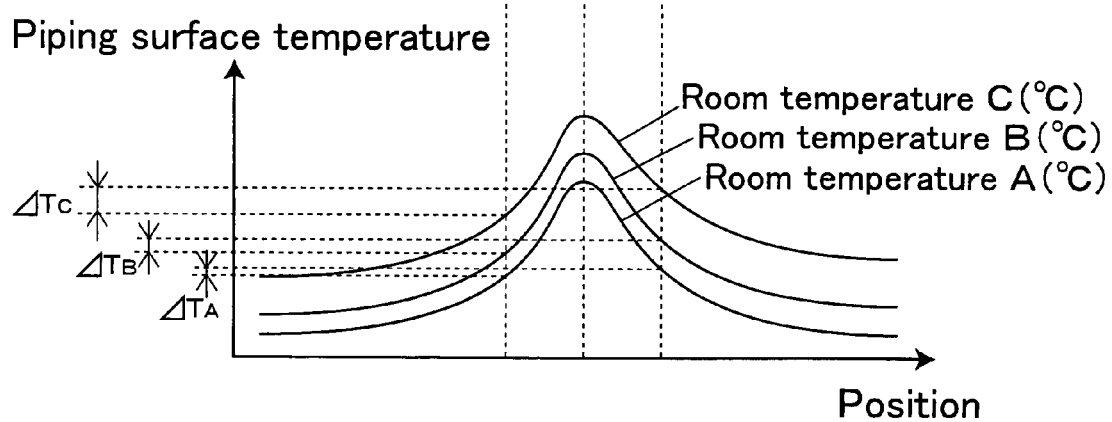
Figure 4C:
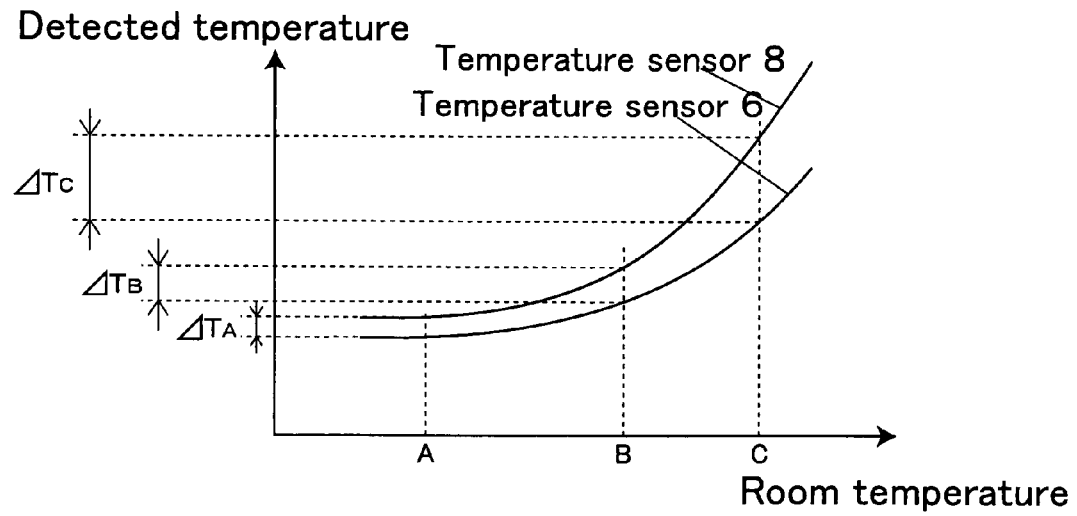
Figure 5A:
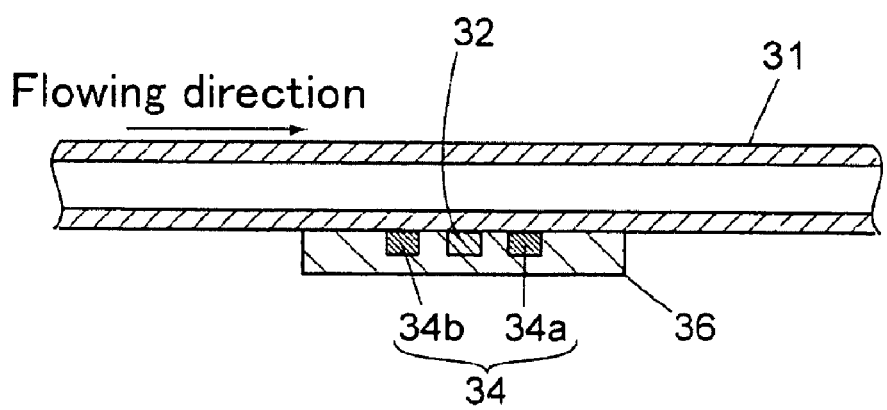
FIGS. 5A to 5B explain a conventional thermal mass flow meter.
Figure 5B:
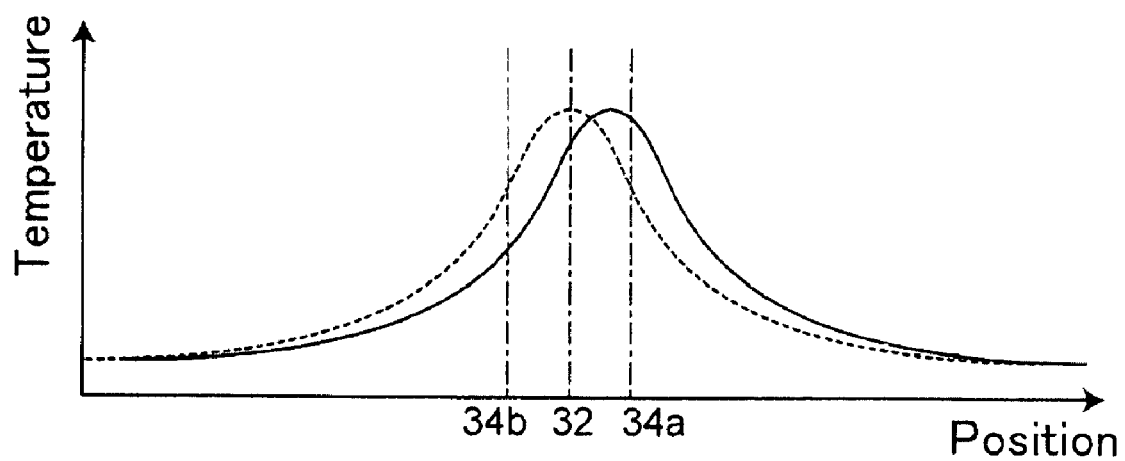

Referring to FIGS. 4A to 4C, the following description will discuss a correcting method of the temperature-difference correcting unit 28. In the case when there is no difference in the thermal capacities between the temperature sensor chips 6 and 8 attached to the upstream side and the downstream side of the heater chip 4, with the heater chip 4 being operated, it is supposed that in the state where the fluid inside the piping 2 stands still, in theory, there is no difference between the temperatures detected by the two temperature sensors 6 and 8. In an actual operation, however, there is sometimes a difference in thermal capacities between the upstream side and the downstream side of the heater chip 4 due to a mechanical difference upon production or the like, and a difference tends to appear between the surface temperatures of the piping 2 at the positions where the temperature sensor chip 6 and the temperature sensor chip 8 are attached. In the case when there is such a difference in thermal capacities between the upstream side and the downstream side of the heater chip 4, upon comparison among cases where, for example, the room temperature are set to A(° C.), B(° C.) and C(° C.) (where C>B>A), as shown in FIG. 4B, the differences $\Delta T_A$, $\Delta T_B$ and $\Delta T_C$ in the detected temperatures by the two temperature sensor chips 6 and 8 become different from one another due to differences in the thermal capacities between the measuring positions of the temperature sensor chip 6 and the temperature sensor chip 8, with the result that upon measuring the flow rate based on these, the flow rate tends to vary due to changes in room temperature. Therefore, the variation in the temperature difference detected by the temperature sensor chips 6 and 8, caused by room temperature, is corrected based upon the room temperature measured by the temperature-measuring element 22.

With the heater chip 4 being operated under predetermined conditions, suppose that the relationship among the detected temperature $T_6$ of the temperature sensor chip 6 on the upstream side, the detected temperature $T_8$ of the temperature sensor chip 8 on the downstream side and room temperature is indicated by a graph shown in FIG. 4C, with the fluid inside the piping 2 standing still.

First, the correlation between the detected temperature difference between the temperature sensor chips 6 and 8 and room temperature is preliminarily measured. For example, the following description will discuss a state in which the difference $\Delta T(X)(=T_8(X)-T_6(X))$ between detected temperatures by the temperature sensor chips 6 and 8 can be approximated by a quadratic function indicated by the following equation (2) at the time of room temperature of X(° C.):

$$\Delta T(X)=aX^2+bX+C \quad (2)$$

Here, "a", "b" and "c" are discrete parameters found from the respective flow meters.

By substituting the room temperature obtained by the temperature-measuring element 22 in X in the above-mentioned equation (2), $\Delta T$ is calculated; thus, the difference $\Delta T$ between detected temperatures by the temperature sensor chips 6 and 8 that has appeared at the corresponding room temperature can be found.

With respect to the approximation equation for the difference $\Delta T(X)$ between detected temperatures, another function other than the above-mentioned equation (2) may be used. Furthermore, the difference $\Delta T$ at room temperature upon measuring the flow rate may be found by using an interpolation method based upon measured values $\Delta T(X)$ of the difference in detected temperatures obtained by changing the room temperature condition in a plurality of ways with the fluid inside the piping 2 standing still.

In this manner, the value ($\Delta t-\Delta T$), obtained by subtracting $\Delta T$ from the difference $\Delta t$ between detected temperatures of the temperature sensor chips 6 and 8 obtained upon measuring the flow rate, can be defined as the difference in detected temperatures by the temperature sensor chips 6 and 8, generated by the fluid flowing through the piping 2.

That is, the temperature-difference correcting unit 28, shown in FIG. 3, calculates $\Delta T$ based upon room temperature measured by the temperature-measuring element 22, and outputs the value obtained by subtracting $\Delta T$ from the difference $\Delta t$ between detected temperatures by the temperature sensor chips 6 and 8 to the flow-rate operation unit 30 as the temperature difference after the correcting process. The flow-rate operation unit 30 calculates the flow rate based upon the temperature difference ($\Delta t-\Delta T$) after the correcting process, given from the temperature-difference correcting unit 28.

In this manner, after the correlation between the difference in detected temperatures by the temperature sensor chips 6 and 8 and room temperature has been preliminarily measured with no fluid flowing through the piping 2, the room temperature is measured upon measuring the flow rate so that the difference in detected temperatures by the temperature sensor chips 6 and 8, generated by the room temperature, is calculated, and the result, which is obtained by subtracting the difference in detected temperatures by the temperature sensor chips 6 and 8 generated by the room temperature from the difference in actually detected temperatures by the temperature sensor chips 6 and 8, is adopted as the difference in detected temperatures for use in calculating the flow rate. With this arrangement, errors that tend to occur upon measuring the flow rate due to a difference in thermal capacities between the upstream side and the downstream side of the heater chip 4 can be minimized.

What is claimed is:

1. A thermal mass flow meter comprising:

a measuring unit configured by a heater chip used for heating a fluid inside a piping, the heater chip being placed on a peripheral face of the piping through which the fluid is allowed to flow, and paired temperature sensor chips, each of which is made of a chip-type temperature sensor chip formed as a member separated from the heater chip, the temperature sensor chips being placed at positions on an upstream side and a downstream side of the heater chip with equal distance apart therefrom, along a flowing direction of the fluid in the piping, on the same side as the heater chip with respect to the piping, on the peripheral face of the piping, each of the temperature sensor chips being coated with a molding resin on a surface thereof, with an input/output terminal extending sideward from a lower face side that corresponds to a face on a side having the smallest thermal resistance up to an element formed inside thereof among faces of the molding resin, each of the temperature sensor chips being anchored on the lower face side; and an operation unit used for finding a flow rate of the fluid flowing through the piping based upon a temperature difference in the paired temperature sensor chips.

2. The thermal mass flow meter according to claim 1, wherein the heater chip is coated with a molding resin on the surface thereof, with an input/output terminal extending sideward from the lower face side that corresponds to a face on the side having the smallest thermal resistance up to an element formed inside thereof among faces of the molding resin, and the heater chip is anchored on the lower face side onto the piping.

3. The thermal mass flow meter according to claim 1, wherein the measuring unit has a temperature-measuring element used for measuring the ambient temperature of the measuring unit, which is installed separately from the paired sensor chips, and the operation unit has a correction unit used for correcting a temperature difference of the paired temperature sensor chips based upon the ambient temperature measured by the temperature-measuring element so that the flow rate of a fluid flowing through the piping is determined from a corrected temperature difference in the paired temperature sensor chips obtained from the correction unit.

4. The thermal mass flow meter according to claim 1, wherein the measuring unit is provided with a substrate having a groove to which the heater chip and the temperature sensor chips are fitted, and the heater chip and the temperature sensor chips are fitted to the groove from an upper surface side opposite to the lower face side so that the piping is anchored onto the lower faces of the heater chip and the temperature sensor chips by a thermal conductive adhesive in contact therewith.

5. The thermal mass flow meter according to claim 4, wherein the piping is anchored onto the substrate by an adhesive.

* * * * *